UNITED STATES PATENT OFFICE.

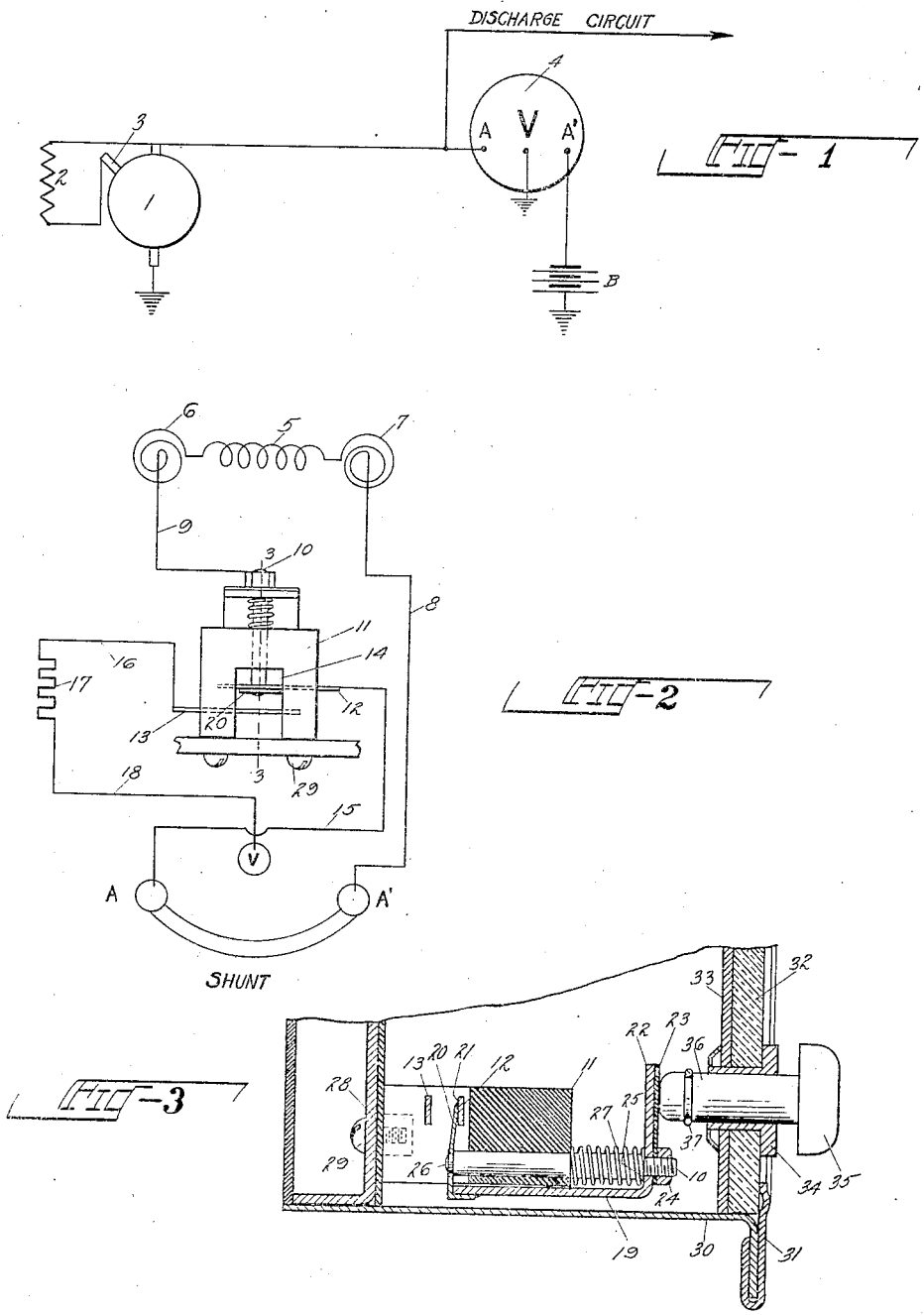

IVAR W. BROEGGER, OF NEWARK, NEW JERSEY, ASSIGNOR TO SPLITDORF ELECTRICAL COMPANY, OF NEWARK, NEW JERSEY.

ELECTRICAL-MEASURING-INSTRUMENT SWITCH.

1,336,419.     Specification of Letters Patent.     Patented Apr. 13, 1920.

Application filed December 31, 1917. Serial No. 209,789.

*To all whom it may concern:*

Be it known that I, IVAR W. BROEGGER, a subject of the King of Norway, residing at Newark, in the county of Essex and State of New Jersey, have invented certain new and useful Improvements in Electrical-Measuring-Instrument Switches, of which the following is a specification.

In the measurement of electrical current two instruments are used, the one for measuring pressure being known as a voltmeter, and that for measuring the amount of current flowing, as an ammeter. It is a great convenience, in many cases, to have a combination instrument, one that will read both volts and amperes. Instruments of this character are usually built in one of two ways. One way is to mount within one case what is really two separate instruments, that is, a complete working mechanism to measure amperes and a complete working mechanism to measure volts, connection being made independently to both said instruments although mounted in the same case. The second method is to use the same indicating mechanism and combine therewith a switch which controls the functions of the indicating mechanism so it will read either amperes or volts. The second plan gives an instrument much smaller, lighter and less expensive than the first method and for many uses is far preferable. This is particularly true in the automotive field where space is limited and cost is an important factor. On account of the extreme sensitiveness of an instrument of this character the construction of the switch, which is used to control the functions of the indicating mechanism, has been a source of considerable trouble as the indicating mechanism is very easily affected by any loose or bad contacts in its electrical circuit. Heretofore it has been customary in the designing of a volt-ammeter of the second kind above mentioned, to mount the controlling switch adjacent and exterior to the casing which contains the indicating mechanism of the instrument.

It is the object of my invention to produce a switch that is not readily affected by the presence of dirt, moisture, change of temperature, and one in which the parts are not readily displaced, whereby poor or loose contacts are encountered.

A further object is to produce a switch which is simple and compact, cheap in construction and one which can be mounted directly within the casing along with the indicating mechanism so that the entire combination is reduced to a minimum size and one in which the electrical conductors joining the switch and the indicating mechanism will be as short as possible.

Other and further objects of my invention will be apparent to one skilled in the art after a study of the specification and attached drawing, wherein Figure 1 illustrates diagrammatically the manner in which my combination instrument may be utilized in a power circuit suitable for an auto-vehicle.

Fig. 2 is a diagrammatic view of the interior wiring of my combination instrument and switch.

Fig. 3 is an enlarged part sectional view through a portion of such an instrument, and through the switch on the line 3—3 of Fig. 2, showing the switch and operating member extending through the casing.

Referring now particularly to the details in which like numbers refer to corresponding parts in the various views, 1 illustrates a charging generator of the third brush type in which the shunt field winding 2 is connected to a brush 3. B is a battery and 4 indicates a combination volt-ammeter in which the two ammeter terminal posts are marked A and A' and the voltmeter connection being marked V.

In Fig. 2 a suitable shunt is connected between the binding posts A and A' and the moving mechanism is connected to these terminal posts and hence across the shunt as will be explained. The instrument shown diagrammatically in Fig. 2 is of the well known D'Arsonval type in which 5 is the moving coil connected to the directing springs 6 and 7. The outer terminal of spring 7 is connected to binding post A' by conductor 8, while the outer end of spring 6 is connected by conductor 9 to a guide rod 10 which passes through an insulating block 11. Block 11 carries two contact strips 12 and 13 which are preferably made of a non-oxidizable metal, said strips being substantially parallel and extending across the slot 14 in the block 11. As shown in Fig. 2 the strip 12 is supported in the insulating material on both sides of the slot 14 and extends beyond the side of the block 11 for the purpose of attaching the conductor 15 which connects to the other binding post A. Likewise the contact strip 13 is supported in the insulating block 11 on both sides of the slot 14 and extends on the opposite sides of the block 11 from the extension 12 and is connected to a non-inductive resistance 17 whose other extremity is connected by conductor 18 to terminal post V. Extending along one side of the block 11 is a support member 19 at the lower end of which is attached, by any suitable means such as by brazing or soldering, a movable contact member 20, which is preferably constructed of non-oxidizable material, whose edge 21 is turned over slightly for a purpose hereinafter described. The upper end of support member has a bent-over portion 22 substantially at right angles to the main part. A strip of insulating material 23 is inserted at the top portion of the bent-over part 22 and is held in position by a nut 24 on the guide rod 10 which is clamped to the bent-over part 22 by the nut 24 drawing the shoulder 25 of rod 10 against the part 22. The guide rod after passing through the insulating block 11 extends into the slot 14 far enough to engage the member 20 and is fastened thereto in any suitable way such as by spinning over or riveting over the head 26 thereon. Supported by the guide rod 10 is a spring 27 which continually exerts an upward pressure on the member 19 and guide rod 10 so as to produce a continual pull or pressure on the member 20 whereby the same will be flexed a certain amount thus increasing the area of a contact over that which would be produced if only just the extreme edge 21 rested against the member 12. This construction assures a wipe contact whenever the switch is operated. The block 11 is mounted on a portion of the bottom casing member 28 by any suitable means such as screws 29. Carried by the casing 30 is a front casing member 31 which with member 33 holds the usual glass front 32 in position. Mounted in the glass front 32 is a bushing 34 and within the bushing is carried a push button 35 the head of which is preferably made of insulating material while the stem 36 may be made of metal and which carries a snap ring 37 on its interior end so that the stem 36 cannot fall out or be withdrawn from the bushing from the face of the instrument. Since the stem 36 normally rests on the insulator 23 the operating member or push button 35 is insulated from the working parts of the switch.

Referring again to Fig. 2 it is seen that when the button 35 is operated to push the guide rod 10 downward that the movable member 20 is carried into engagement with the contact strip 13 and in this position the moving coil 5 will be included in circuit with the non-inductive resistance 17 and the voltage terminal post and the instrument will then indicate the voltage of the circuit. When the pressure is removed from the bottom 35 the spring 27 will carry the switch parts back to their normal position so that the instrument will then indicate the amperes flowing through the shunt.

Inasmuch as Fig. 3 shows the parts enlarged about 2½ times the actual size it will be readily understood that the switch mechanism is very small and compact and thus can be placed within the interior part of the casing of a relatively small instrument.

It is to be understood that certain changes may be made in the various details of my invention without departing from the intent thereof or the scope of the appended claims.

Having thus described my invention what I claim is:—

1. In a switch for electrical measuring instruments, the combination of a block of insulating material having a slot therein, contact strips mounted one above the other on said block and extending across said slot, a movable contact member located in said slot and normally in contact with the upper of said strips, a member adapted to support said movable contact member and means for receiving an actuating force coacting with said support member to move it and the movable member into engagement with the bottom strip, and means to return the contact member and its support to their normal position when the actuating force is removed.

2. In a switch for electrical measuring instruments, the combination of a block of insulating material having a slot and contact strips extending across the slot molded therein, a guide rod extending through the block into said slot, a support member carried by said rod, a contact member fastened to said support and said rod and in normal engagement with one of said strips, means adapted to receive an actuating force coacting with said support member to move the contact member into engagement with the other contact strip and means to return the contact member to its normal position when the first mentioned means is in neutral position.

3. In a switch for electrical measuring instruments, the combination of a block of insulating material having a slot and contact strips extending across the slot molded therein, a guide rod extending through the block into said slot, a support member extending along the side of said block and over said slot and having a portion bent over into engagement with said rod, a contact member positioned in said slot between said strips and in normal engagement with one of them and carried by said support member and also having said rod attached thereto, a push button adapted to act on said support member to move the contact member into engagement with the other of said strips and a spring held in position by said rod between the block and the bent over portion of the support member for returning the support member and contact member to normal position.

4. A switch for controlling the functions of an electrical measuring mechanism having the following instrumentalities; a block of insulating material carrying two substantially horizontal and parallel contact strips, a support member extending along one side of said block and having one end bent over substantially at a right angle thereto, a contact member for contacting with said strips carried on the other end of the support member and normally in engagement with one of said strips, a guide rod passing through said block and engaging the contact member at one end and the bent over part of the support member at the other end, a push button for operating the support member normally resting on the bent over part of the support member and a spring held in position by said guide rod for returning to normal position the support member and contact member after they have been operated as described by the push button.

5. A switch for controlling the functions of an electrical measuring mechanism having the following instrumentalities; a block of insulating material carrying two substantially horizontal and parallel contact strips, a support member extending along one side of said block and having one end bent over substantially at a right angle thereto, a contact member for contacting with said strips carried on the other end of the support member and normally in engagement with one of said strips, a guide rod passing through said block and engaging the contact member at one end and the bent over part of the support member at the other end, a strip of insulating material carried on the bent over part of the support member, a push button having a stem resting on said insulating strip, means for holding the push button in working relationship with said strip, and a spring acting on said support member to return it and the contact member to normal position after they have been operated as described by the push button.

6. A switching device for controlling the functions of a two circuit indicating mechanism consisting of the following instrumentalities; a block of insulating material having contact strips molded therein in substantial parallel position with their central portions exposed and the end of one extending outside one side of the block and the end of the other extending outside the opposite side of the block one of said exposed ends being connected to one circuit and the other exposed end being connected to the other circuit, a movable contact member positioned between said strips at the central exposed part and in normal contact with one of said strips, a support member carrying said contact member, a guide rod engaging both the support member and the contact member and adapted to be in permanent electrical connection with the indicating mechanism whereby when said support member and guide rod are moved the indicating mechanism is switched from one circuit to the other circuit.

In witness whereof, I affix my signature.

IVAR W. BROEGGER.